(12) United States Patent
Chang et al.

(10) Patent No.: US 9,562,119 B2
(45) Date of Patent: Feb. 7, 2017

(54) ETHYLENE POLYMERIZATION CATALYSTS

(75) Inventors: Main Chang, Houston, TX (US);
Thomas Garoff, Helsinki (FI)

(73) Assignee: W. R. Grace & Co.-Conn., Columbia, MD (US)

( * ) Notice: Subject to any disclaimer, the term of this patent is extended or adjusted under 35 U.S.C. 154(b) by 838 days.

(21) Appl. No.: 12/786,701

(22) Filed: May 25, 2010

(65) Prior Publication Data

US 2011/0294970 A1    Dec. 1, 2011

(51) Int. Cl.

| | |
|---|---|
| *B01J 31/00* | (2006.01) |
| *B01J 37/00* | (2006.01) |
| *C08F 4/02* | (2006.01) |
| *C08F 4/60* | (2006.01) |
| *C08F 110/02* | (2006.01) |
| *C08F 4/44* | (2006.01) |
| *C08F 2/00* | (2006.01) |

(52) U.S. Cl.
CPC .................................. *C08F 110/02* (2013.01)

(58) Field of Classification Search
CPC ................. C08F 2/00; C08F 4/02; C08F 4/60; B01J 31/00; B01J 37/00
USPC .......................... 502/116, 158, 156, 172, 127
See application file for complete search history.

(56) References Cited

U.S. PATENT DOCUMENTS

| | | | | |
|---|---|---|---|---|
| 2,822,357 | A | * | 2/1958 | Lee Brebner Donald et al. ............................... 526/138 |
| 4,143,223 | A | * | 3/1979 | Toyota et al. ............ 526/125.6 |
| 4,399,054 | A | | 8/1983 | Ferraris et al. |
| 5,155,078 | A | | 10/1992 | Kioka et al. |
| 5,192,729 | A | | 3/1993 | Woo et al. |
| 5,464,905 | A | | 11/1995 | Tsutsui et al. |
| 5,767,034 | A | | 6/1998 | Diaz-Barrios et al. |
| 5,932,510 | A | * | 8/1999 | Hosaka .................. C08F 10/00 502/114 |
| 6,080,828 | A | | 6/2000 | Kojoh et al. |
| 6,664,209 | B1 | * | 12/2003 | Hosaka .................. C08F 10/06 502/125 |
| 6,806,222 | B2 | | 10/2004 | Yashiki et al. |
| 7,153,803 | B2 | | 12/2006 | Zhu et al. |
| 7,592,286 | B2 | | 9/2009 | Morini et al. |
| 2003/0069372 | A1 | * | 4/2003 | Lu et al. .................... 526/125.3 |
| 2005/0288460 | A1 | * | 12/2005 | Zhu ........................ C08F 10/00 526/124.3 |

* cited by examiner

*Primary Examiner* — Alexa Neckel
*Assistant Examiner* — Elizabeth Eng
(74) *Attorney, Agent, or Firm* — Lowenstein Sandler LLP

(57) ABSTRACT

The present invention relates to solid catalyst components comprising a reaction product of a titanium compound, a magnesium compound, an alcohol, an aluminum alkoxide, a siloxane mixture, and a maleate derivative; and catalyst systems comprising the solid catalyst components and organoaluminum compounds. The present invention also relates to methods of making the solid catalyst components and the catalyst systems, and methods of polymerizing or copolymerizing ethylene using the catalyst systems.

12 Claims, 1 Drawing Sheet

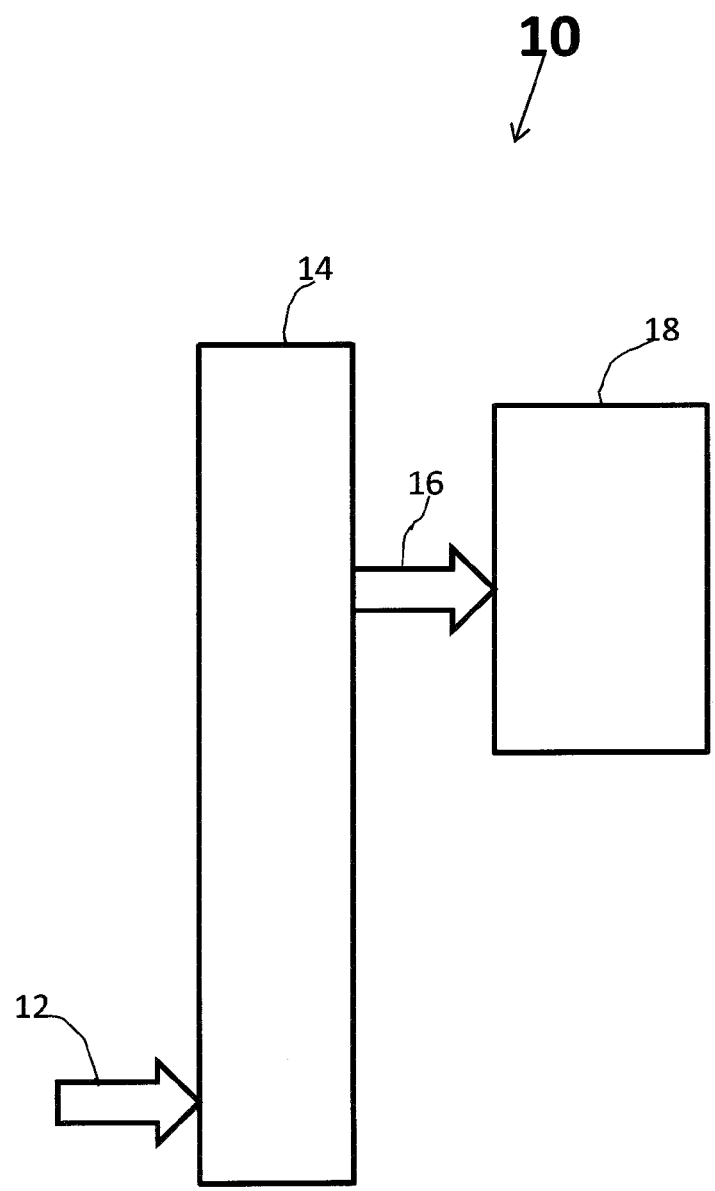

ETHYLENE POLYMERIZATION CATALYSTS

TECHNICAL FIELD

The present invention generally relates to ethylene polymerization catalyst components. In particular, the present invention relates to solid catalyst components comprising a reaction product of a titanium compound, a magnesium compound, an alcohol, an aluminum alkoxide, a siloxane mixture and a maleate derivative; and catalyst systems comprising the catalyst components and organoaluminum compounds. The present invention further relates to methods of making the solid catalyst components and the catalyst systems, methods of polymerizing or copolymerizing ethylene using the catalyst systems, and polyethylene prepared from using the catalyst systems.

BACKGROUND

Polyethylene is one of the most popular plastic in the world. Polyethylene is used to make grocery bags, shampoo bottles, toys, pipes, containers, drums, and even body armors. For such a versatile material, it has a very simple structure, the simplest of all commercial polymers. Specifically, polyethylene contains a long chain alkane with different alkyl substitutes. The long chain alkane having other long chain alkyl branching is called low density polyethylene (LDPE). The long chain alkane containing many short chain alkyl branches is called linear low density polyethylene (LLDPE). High density polyethylene (HDPE) has very little alkyl branching, resulting in the polyethylene with high crystallinity and high density. Linear polyethylene is generally much stronger than branched polyethylene, but branched polyethylene is typically cheaper and easier to make and process.

Ziegler-Natta catalyst systems have been used to make a wide variety of ethylene polymers including HDPE and LLDPE with high polymerization activity. The most widely used Ziegler-Natta catalyst systems comprise titanium, magnesium, halogen and optionally electron donors. It is known that high activities are exhibited especially when a Ziegler-Natta catalyst component is obtained from a liquid magnesium halogen, a liquid titanium compound and an electron donor.

Ziegler-Natta catalysts have been continuously developed for making polyethylene with higher activity and various polymer properties. For example, U.S. Pat. No. 7,153,803 discloses the addition of an alkyl silicate and a monoester in a traditional titanium catalyst. The resulted solid titanium catalyst component has increased catalytic activity. Employing this solid titanium catalyst component, less hydrogen is used in producing polyethylene with lower molecular weight.

The inventors have tested a number of organic compounds as additives in the Ziegler-Natta catalyst syntheses and found that adding a specific family of organic compounds in the catalysts can produce polyethylene with a narrow molecular weight distribution and other distinct polymer properties.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereafter.

The present invention provides ethylene polymerization catalyst components, catalyst systems, methods of making the solid catalyst components and systems, and methods of polymerizing and copolymerizing ethylene involving the use of the catalyst systems. The solid catalyst components comprise a reaction product of a magnesium compound, an aluminum alkoxide, an alcohol, a siloxane mixture, a titanium compound, and a maleate derivative. The catalyst systems comprise the solid catalyst components and organoaluminum compounds. The method of polymerizing or copolymerzing ethylene involves contacting ethylene or ethylene and comonomers with the catalyst systems.

To the accomplishment of the foregoing and related ends, the invention involves the features hereinafter fully described and particularly pointed out in the claims. The following description and the annexed drawing set forth in detail certain illustrative aspects and implementations of invention. These are indicative, however, of but a few of the various ways in which the principles of the invention may be employed. Other objects, advantages and novel features of the invention will become apparent from the following detailed description of the invention when considered in conjunction with the drawings

BRIEF SUMMARY OF THE DRAWING

FIG. 1 is a high level schematic diagram of ethylene polymerization system in accordance with one aspect of the present invention.

DETAILED DESCRIPTION

The present invention relates to solid catalyst components comprising a reaction product of a titanium compound, a magnesium compound, an alcohol, an aluminum alkoxide, a siloxane mixture, and a maleate derivative; catalyst systems comprising the solid catalyst components and organoaluminum compounds; methods of making the solid catalyst components and systems; and methods of polymerizing and copolymerizing ethylene in the presence of hydrogen using the catalyst systems. The catalyst systems are especially suitable for making high density polyethylene (HDPE) and linear low density polyethylene (LLDPE).

The solid catalyst components for ethylene polymerization of the present invention is obtained by adding a magnesium compound, an aluminum alkoxide, and a siloxane mixture into an alcohol to form a mixture; heating the mixture to form a magnesium solution; contacting the magnesium solution with a titanium compound and then with a siloxane mixture to form a liquid catalyst intermediate; heating the liquid catalyst intermediate to form catalyst intermediate particles; and contacting the catalyst intermediate particles with a maleate derivative to form the solid catalyst component.

An aspect of the invention is forming a magnesium solution from a reaction of a magnesium compound, an aluminum alkoxide, a siloxane mixture, and an alcohol. Generally speaking, the magnesium solution is made by contacting at least one magnesium compound, at least one aluminum alkoxide, and at least one siloxane mixture in the presence of an alcohol and optionally an inert diluent under elevated temperatures (above room temperature).

The magnesium compounds used in preparation of the magnesium solution and ultimately the solid catalyst components include, for example, a magnesium compound having reducibility and a magnesium compound having no reducibility. Specific examples of the magnesium compounds having no reducibility include, but are not limited to, magnesium halides such as magnesium chloride, magnesium bromide, magnesium iodide and magnesium fluoride; alkoxy magnesium halides such as methoxy magnesium chloride, ethoxy magnesium chloride, isopropoxy magnesium chloride, butoxy magnesium chloride and octoxy magnesium chloride; aryloxy magnesium halides such as phenoxy magnesium chloride and methylphenoxy magnesium chloride; alkoxy magnesiums such as ethoxy magnesium, isopropoxy magnesium, butoxy magnesium, n-octoxy magnesium and 2-ethylhexoxy magnesium; aryloxy magnesiums such as phenoxy magnesium and dimethylphenoxy magnesium; carboxylic acid salts of magnesium such as magnesium laurate and magnesium stearate; metallic magnesium; and magnesium hydrides. These magnesium compounds may be in the liquid or solid states.

The magnesium compound having reducibility is, for example, an organomagnesium compound represented by the following formula (I):

$$X_nMgR_{2-n} \qquad (I)$$

wherein n is number of 0≤n<2; R is hydrogen, an alkyl group of 1 to about 20 carbon atoms, an aryl group or a cycloalkyl group; when n is 0, two Rs may be the same as or different from each other, and X is halogen.

Specific examples of organomagnesium compound having reducibility include, but are not limited to, dialkyl magnesium compounds such as dimethyl magnesium, diethyl magnesium, dipropyl magnesium, dibutyl magnesium, ethylbutyl magnesium, diamyl magnesium, dihexyl magnesium, didecyl magnesium and octylbutylmagnesium; monoalkyl magnesium monohalides such as ethyl magnesium chloride, propyl magnesium chloride, butyl magnesium chloride, hexyl magnesium chloride and amyl magnesium chloride; alkylmagnesium alkoxides such as butylethoxymagnesium, ethylbutoxymagnesium and octylbutoxymagnesium; and other compounds such as butylmagnesium hydride. These magnesium compounds may be in the liquid or solid states.

The magnesium compound having no reducibility may be a compound derived from the magnesium compound having reducibility separately or at the time of preparing the catalyst component. This is affected, for example, by contacting the magnesium compound having reducibility with such a compound as a polysiloxane compound, a halogen-containing silane compound, a halogen-containing aluminum compound, an ester or an alcohol. In addition to the above magnesium compounds having no reducibility, the magnesium compound used in this invention may also be a complex compound or a double compound with another metal or a mixture with another metal compound.

In one aspect of the present invention, the magnesium compounds having no reducibility are used. In another aspect of the present invention, halogen containing magnesium compounds, such as magnesium chloride, alkoxy magnesium chlorides and aryloxy magnesium chlorides, are employed.

The aluminum alkoxide used in preparing the magnesium solution is represented by the following general formula (II):

wherein R, R' and R" are the same or different hydrocarbyl radicals of not more than 12 carbon atoms, such as methyl, ethyl, propyl, isopropyl, butyl, sec-butyl, or t-butyl.

Specific examples of the above formula include, but are not limited to, diethoxyaluminum butoxide, ethoxyaluminum dibutoxide, aluminum trimethoxide, aluminum triethoxide, aluminum tri-n-propoxide, aluminum triisopropoxide, aluminum tri-n-butoxide, aluminum tri-sec-butoxide, and aluminum tri-t-butoxide.

Siloxane is a compound having a siloxane bond (—S—O—) in the main chain. Examples include disiloxanes such as an alkyl disiloxane, halogen-substituted alkyl disiloxane, 1,3-dihaloalkyl disiloxane, and 1,3-dihalophenyl disiloxane. Specific examples of disiloxanes include, but are not limited to, hexamethyldisiloxane, hexaethyldisiloxane, hexapropyldisiloxane, hexaphenyldisiloxane, 1,3-divinyltetramethyldisiloxane, 1,3-dichlorotetramethyldisiloxane, 1,3-dibromotetramethyldisiloxane, chloromethylpentamethyldisiloxane, and 1,3-bis(chloromethyl)tetramethyldisiloxane.

Trisiloxane, tetrasiloxane, and pentasiloxane are the compounds containing three, four and five siloxane bonds, respectively. Specific examples of the trisiloxanes, tetrasiloxanes, and pentasiloxanes include, but are not limited to, 1,5-dichlorohexamethyltrisiloxane, 1,7-dichlorooctamethyltetrasiloxane, 1,5-dibromohexamethyltrisiloxane, 1,7-dibromooctamethyltetrasiloxane, 3-chloromethylheptamethyltrisiloxane, 3,5-bis(chloromethyl)octamethyltetrasiloxane, 3,5,7-tris(chloromethyl)nonamethylpentasiloxane, 3-bromomethylheptamethyltrisiloxane, 3,5-bis(bromomethyl)octamethyltetrasiloxane, and 3,5,7-tris(bromomethyl)nonamethylpentasiloxane. In one embodiment, trisiloxane, tetrasiloxane, and pentasiloxane include methyl groups.

Polysiloxane is a polymer and can be represented by the following general formula (III):

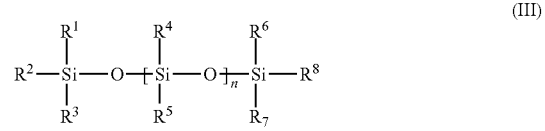

In the foregoing general formula, n represents an average polymerization degree from 2 to 30,000. Most of $R^1$ to $R^8$ represents a methyl group. A phenyl group, hydrogen atom, high fatty acid residue having a carbon number of 10 to 20, epoxy-containing group or polyoxyalkylene group having a carbon number of 1 to 10 may substitute some of $R^1$ to $R^8$. The compound represented by the forgoing general formula may form cyclic polysiloxane in which $R^4$ and $R^5$ each are methyl group.

The polysiloxane is generally known as silicone oil. It is a chain, partial hydrogenated cyclic or denatured polysiloxane having a viscosity of from 2 to 10,000 cSt., preferably from 3 to 500 cSt at 25° C., which stays liquid or viscous at room temperature.

Specific examples of the chain-structured polysiloxanes include, but are not limited to, dimethylpolysiloxane, methylphenylpolysiloxane, dichloropolysiloxane, and dibromopolysiloxane. Specific examples of the partially hydrogenated polysiloxanes include methyl hydrogen polysiloxanes with a hydrogenation degree of 10 to 80%.

Specific examples of the cyclic polysiloxane include, but are not limited to, hexamethylcyclotrisiloxane, octamethylcyclotetrasiloxane, decamethylcyclopentasiloxane, 2,4,6-trimethylcyclotrisiloxane, and 2,4,6,8-tetramethylcyclotetrasiloxane. Specific examples of the denatured polysiloxane include, but are not limited to, higher fatty acid group-substituted dimethylsiloxane, epoxy group-substituted dimethylsiloxane, and polyoxyalkylene group-substituted dimethylsiloxane.

In one embodiment, a siloxane mixture is selected from the group consisting of octamethyltrisiloxane, decamethyltetrasiloxane, dodecamethylpentasiloxane, polymethylsiloxane, and mixtures thereof.

The alcohol used in preparing the magnesium solution contains about 8 to about 20 carbon atoms. Specific examples of alcohol include, but are not limited to, 1-octanol, 2-octanol, 3-octanol, 6-methyl-2-heptanol, 4-methyl-3-heptanol, 2-ethyl-1-hexanol, 2-propyl-1-pentanol, 2,4,4-trimethyl-1-pentanol, decanol, dodecanol, tetradecyl alcohol, undecenol, oleyl alcohol, stearyl alcohol, isopropylbenzyl alcohol, α,α-dimethylbenzyl alcohol, octadecyl alcohol, phenylethyl alcohol, cumyl alcohol, xylenol, ethylphenol, propylphenol, nonylphenol, and naphthol.

The magnesium compound, aluminum alkoxide, siloxane mixture and alcohol can be combined in any order (all four at once; the magnesium compound and the alcohol initially combined, followed by addition of the siloxane mixture and aluminum alkoxide; or the siloxane mixture, aluminum alkoxide, and the alcohol initially combined, followed by addition of the magnesium compound).

For more sufficiently dispersing the dissolved magnesium compound, an inert diluent can optionally be added into the mixture containing a magnesium compound, an aluminum alkoxide, a siloxane mixture and an alcohol. The inert diluent can typically be aromatic hydrocarbons or alkanes, as long as it can facilitate the dispersing of the magnesium compound. Examples of aromatic hydrocarbons include, but are not limited to, benzene, toluene, xylene, ethylbenzene, cumene, cymene, chlorobenzene, dichlorobenzene, trichlorobenzene, chlorotoluene, and derivatives thereof. Examples of alkanes include linear, branched, or cyclic alkanes having about 3 to about 30 carbons, such as propane, butane, pentane, hexane, heptanes, octane, decane, tetradecane, dodecane, kerosene, cyclopentane, methylcyclopentane, cyclohexane, methylcyclohexane, cyclooctane, and the like. These inert diluents may be used alone or in combination.

The mixture of the magnesium compound, the aluminum alkoxide, the siloxane mixture, the alcohol, and the inert diluent is optionally heated at or above room temperature for a suitable amount of time. In one embodiment, the mixture is heated to a temperature of 65° C. or higher for a period of time from about 15 minutes to about 8 hours. In another embodiment, the mixture is heated to a temperature from about 80° C. to about 130° C. for a period of time from about 30 minutes to about 5 hours. In yet another embodiment, the mixture is heated to a temperature from about 100° C. to about 120° C. for a period of time from about 1 hour to about 4 hours.

A suitable amount of alcohol is employed to dissolve the magnesium compound. In one embodiment, the molar ratio of alcohol to magnesium compound is from about 3:1 to about 20:1. In another embodiment, the molar ratio of alcohol to magnesium compound is from about 3:1 to about 10:1. In yet another embodiment, the molar ratio of alcohol to magnesium compound is from about 3:1 to about 5:1.

In one embodiment, the inert diluent is used in such an amount that the concentration of magnesium in the resulting magnesium solution becomes from about 0.3 to about 1 mol/liter.

In the magnesium solution, aluminum/magnesium (atomic ratio) is from about 0.01 to about 1 and silicon/magnesium (atomic ratio) is from about 0.1 to about 3. In one embodiment, aluminum/magnesium (atomic ratio) is from about 0.02 to about 0.7 and silicon/magnesium (atomic ratio) is from about 0.2 to about 2.5. In another embodiment, aluminum/magnesium (atomic ratio) is from about 0.03 to about 0.6 and silicon/magnesium (atomic ratio) is from about 0.3 to about 1.0.

The solid catalyst component used in this invention is highly active catalyst component comprising a reaction product from at least one titanium compound, at least one internal electron donor, and a magnesium solution as described above.

The titanium compounds used in the preparation of the solid catalyst components include, for example, a tetravalent titanium compound represented by chemical formula (IV):

$$Ti(OR)_g X_{4-g} \qquad (IV)$$

wherein R represents a hydrocarbon group, preferably an alkyl group having 1 to about 20 carbon atoms, X represents a halogen atom, and $0 \leq g \leq 4$. Specific examples of the titanium compound include, but are not limited to, titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(O-n-C_4H_9)Cl_3$, $Ti(OC_2H_5)Br_3$ and $Ti(O-i-C_4H_9)Br_3$; dialkoxytitanium dihalides such as $Ti(OCH_3)_2Cl_2$, $Ti(OC_2H_5)_2Cl_2$, $Ti(O-n-C_4H_9)_2Cl_2$ and $Ti(OC_2H_5)_2Br_2$; trialkoxytitanium monohalides such as $Ti(OCH_3)_3Cl$, $Ti(OC_2H_5)_3Cl$, $Ti(O-n-C_4H_9)_3Cl$ and $Ti(OC_2H_5)_3Br$; and tetraalkoxytitaniums such as $Ti(OCH_3)_4$, $Ti(OC_2H_5)_4$ and $Ti(O-n-C_4H_9)_4$. Among these, the halogen containing titanium compounds, especially titanium tetrahalides, are preferred in some instances. These titanium compounds may be used individually or in solutions of hydrocarbon compounds or halogenated hydrocarbons.

In one embodiment in the preparation of the solid catalyst component, an internal electron donor is not used. In another embodiment in the preparation of the solid catalyst component, internal electron donors, for example, oxygen-containing electron donors such as siloxanes and polycarboxylic acid esters are used. The siloxanes and siloxane mixtures described previously can be used as electron donors to make the solid catalyst components.

Examples of the polycarboxylic acid esters include maleate derivatives represented by the following chemical formula (V):

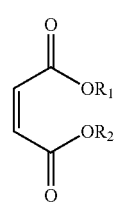

(V)

wherein $R_1$ and $R_2$ are the same or different, each represents $C_2$-$C_{20}$ liner alkyl, $C_2$-$C_{20}$ branched alkyl, or $C_7$-$C_{20}$ alkylaryl radicals.

Specific examples of the maleate derivatives include, but are not limited to, ethylmethyl maleate, methyl(isopropyl)

maleate, ethyl(n-propyl) maleate, ethyl(n-butyl) maleate, ethyl(isobutyl) maleate, n-butyl(isohexyl) maleate, n-butyl (2-ethylhexyl) maleate, n-pentylhexyl maleate, n-pentyl(isohexyl) maleate, isopentyl(heptyl) maleate, n-pentyl(2-ethylhexyl) maleate, n-pentyl(isononyl) maleate, isopentyl(n-decyl) maleate, n-pentylundecyl maleate, isopentyl (isohexyl) maleate, n-hexyl(2,2-dimethylhexyl) maleate, n-hexyl(2-ethylhexyl) maleate, n-hexyl(isononyl) maleate, n-hexyl(n-decyl) maleate, n-heptyl(2-ethylhexyl) maleate, n-heptyl(isononyl) maleate, n-heptyl(neodecyl) maleate, and 2-ethylhexyl(isononyl) maleate.

In one embodiment, maleate derivatives are dialkyl maleates. Specific examples of the dialkyl maleates include, but are not limited to, diethyl maleate, di-n-propyl maleate, di-iso-propyl maleate, di-n-butyl maleate, di-iso-butyl maleate, di-n-pentyl maleate, di-iso-pentyl maleate, dineopentyl maleate, di-n-hexyl maleate, di-iso-hexyl maleate, di-n-heptyl maleate, di-iso-heptyl maleate, di-n-octyl maleate, bis(2,2-dimethylhexyl) maleate, bis(2-ethylhexyl) maleate, di-n-nonyl maleate, diisodecyl maleate, and bis(2,2-dimethylheptyl) maleate.

In employing the internal electron donors, they do not have to be used directly as starting materials, but compounds convertible to the electron donors in the course of preparing the solid catalyst components may also be used as the starting materials.

In embodiments of making the solid catalyst component according to the Examples, a titanium compound such as liquid titanium tetrahalide contacts with the magnesium solution, optionally in the presence of an inert diluent to form a liquid mixture. The temperature of the contacting is in the range about −30° C. to about −10° C. The aforesaid inert diluents used for preparing the magnesium solution may be employed. The liquid mixture is heated to a temperature from about 10° C. to about 50° C. An internal electron donor compound such as a siloxane mixture can be added into the liquid mixture to form a liquid catalyst intermediate. The titanium compound is used in a sufficient amount that a solid can be precipitated by heating up the liquid catalyst intermediate.

The liquid catalyst intermediate can be heated and held at a temperature in the range of about 50° C. to about 100° C. for about 30 minutes to about 2 hours. The liquid catalyst intermediate can then be converted to catalyst intermediate particles. The catalyst intermediate particles can be isolated through filtration and then mixed with an additional inert diluent to form a slurry.

An internal electron donor such as a maleate derivative may be contacted with the slurry containing the catalyst intermediate particles. The contact time is in the range of about 10 to about 120 minutes. The contact temperature is in the range of 50° C. to about 100° C. The crude catalyst particles are obtained after the liquids are filtered out.

The crude catalyst particles can be further washed with an inert diluent to remove any byproducts. The inert diluent herein used can be hexane, heptanes, octane, and other hydrocarbons.

By washing the crude catalyst particles with an inert diluent, the extractable titanium compound can be removed from the crude catalyst particles. As a result, the resultant solid catalyst particles/solid catalyst components do not substantially contain extractable titanium compounds. In one embodiment, the crude catalyst particles are washed repeatedly with an inert diluent until the solid catalyst particles contain about 2000 ppm or less of titanium. In another embodiment, the crude catalyst particles are washed repeatedly with an inert diluent until the solid catalyst particles contain about 1000 ppm or less of titanium. In yet another embodiment, the crude catalyst particles are washed with an inert diluent until the solid catalyst particles contain about 500 ppm or less of titanium. In one embodiment, the crude catalyst particles can be washed with an inert diluent about three times or more and seven times or less.

In one embodiment, the solid catalyst component contains from about 5.0 to about 9.0 wt % of titanium, from about 10 to about 15 wt % of magnesium, and from about 5 to about 40 wt % of the internal electron donors of siloxane mixtures and maleate derivatives. In another embodiment, the solid catalyst component contains from about 5 to about 30 wt % of the internal electron donors. In yet another embodiment, the solid catalyst component contains from about 10 to about 25 wt % of the internal electron donors.

The catalyst system may contain at least one organoaluminum compound in addition to the solid catalyst component. Compounds having at least one aluminum-carbon bond in the molecule can be used as the organoaluminum compounds. Examples of organoaluminum compounds include compounds of the following chemical formula (VI):

$$AlR_nX_{3-n} \quad (VI)$$

In formula (VI), R represents a hydrocarbon group usually having 1 to about 20 carbon atoms, X represents a halogen atom, and $0<n\leq3$.

Specific examples of the organoaluminum compounds represented by formula (VI) include, but are not limited to, trialkyl aluminums such as triethyl aluminum, tributyl aluminum and trihexyl aluminum; trialkenyl aluminums such as triisoprenyl aluminum; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; and other partially hydrogenated alkyl aluminums such as ethyl aluminum dihydride and propyl aluminum dihydride.

The organoaluminum compound is used in the catalyst system of the present invention in an amount that the mole ratio of aluminum to titanium (from the solid catalyst component) is from about 1 to about 100. In another embodiment, the mole ratio of aluminum to titanium in the catalyst system is from about 2 to about 70. In yet another embodiment, the mole ratio of aluminum to titanium in the catalyst system is from about 2.5 to about 40.

Polymerization of ethylene in accordance with the present invention is carried out in the presence of the catalyst system described above in any suitable process. Generally speaking, ethylene is contacted with the catalyst system described above under suitable conditions, typically in the presence of hydrogen, to form desired polyethylene products.

In polymerization, the solid catalyst component is usually employed in combination with at least a portion of the organoaluminum compound. In one embodiment, the polymerization is carried out by adding ethylene and the above catalyst system ingredients to an inert hydrocarbon medium and the ethylene is polymerized under mild conditions.

Specific examples of the inert hydrocarbon medium include aliphatic hydrocarbons such as propane, butane, isobutane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene; and mixtures thereof. In the present invention, a liquid olefin may be used in place of part or the whole of the inert hydrocarbon medium.

In the process of the present invention, the polymerization of ethylene can be carried out in the gaseous phase, suspension phase, or liquid phase. In one embodiment, when the polymerization is carried out in a slurry reaction mode, the aforesaid inert hydrocarbons may be used as a reaction solvent. In another embodiment, polyethylene which is liquid at the reaction temperature may alternatively be used as the reaction solvent. In yet another embodiment, an inert hydrocarbon and ethylene which is liquid at the reaction temperature may be employed as the reaction solvent.

In one embodiment, the ethylene polymerization is desirably carried out so that from about 2 k g to about 60 kg of polyethylene is formed per gram of the solid catalyst component of the catalyst system. In another embodiment, the polymerization is desirably carried out so that from about 5 kg to about 30 kg of polyethylene is formed per gram of the titanium catalyst component.

In one embodiment, polymerization of the present invention employs a catalyst system containing the solid catalyst component in an amount from about 0.001 to about 0.75 millimole calculated as Ti atom per liter of the volume of the polymerization zone, and the organoaluminum compound in an amount from about 1 to about 100 moles per mole of titanium atoms in the solid catalyst component. In another embodiment, polymerization employs a catalyst system containing the solid catalyst component in an amount from about 0.005 to about 0.5 millimole calculated as Ti atom per liter of the volume of the polymerization zone, and the organoaluminum compound in an amount from about 5 to about 50 moles per mole of titanium atoms in the solid catalyst component.

The use of hydrogen at the time of polymerization promotes and contributes to control the molecular weight of the resulting polymer, and the polymer obtained may have a higher and/or controllable melt flow rate. In this case, the activity of the catalyst system is not decreased according to the methods of the present invention.

In one embodiment, the polymerization temperature of the present invention is from about 0° C. to about 200° C. In another embodiment, the polymerization temperature of the present invention is from about 20° C. to about 180° C. In one embodiment, the polymerization pressure is typically from about atmospheric pressure to about 100 kg/cm². In another embodiment, the polymerization pressure is typically from about 2 kg/cm² to about 50 kg/cm². The polymerization may be carried out batchwise, semi-continuously or continuously. The polymerization may also be carried out in two or more stages under different reaction conditions.

The polyethylene so obtained may be a homopolymer of ethylene, a random copolymer of ethylene and an alpha-olefin, or a block copolymer of ethylene and an alpha-olefin. The polyethylene obtained by the process of the present invention is excellent in particle size distribution, particle diameter and bulk density, and the polyethylene obtained has a narrow composition distribution.

In one aspect of the present invention, there is provided an ethylene copolymer comprising a copolymer of ethylene with an alpha-olefin compound represented by the formula $H_2C=CHR$ wherein R is a $C_1$-$C_{20}$ linear, branched or cyclic alkyl group or a $C_6$-$C_{20}$ aryl group, and a $C_4$-$C_{20}$ linear, branched or cyclic diene.

Specific examples of the alpha-olefin compound include, but are not limited to, propylene, 1-butene, 1-pentene, 4-methyl-1-pentene, 1-octene, 1-hexene, 3-methyl-1-pentene, 3-methyl-1-butene, 1-decene, 1-dodecene, vinylcyclohexane, 1-tetradecene, 1-hexadecene, 1-octadocene, 1-eicosene, and the like.

Further, vinyl compounds, other unsaturated compounds and polyene compounds can also be copolymerizable with ethylene. The comonomers include, but are not limited to, aromatic vinyl compounds such as styrene, substituted styrenes, allylbenzene, substituted allylbenzenes, vinylnaphthalenes, substituted vinylnaphthalenes, allylnaphthalenes and substituted allylnaphthalenes; alicyclic vinyl compounds such as vinylcyclopentane, substituted vinylcyclopentanes, vinylcyclohexane, substituted vinylcyclohexanes, vinylcycloheptane, substituted vinylcycloheptanes and allylnorbornane; cycloolefins such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene; and unsaturated silane compounds such as allyltrimethylsilane, allyltriethylsilane, 4-trimethylsilyl-1-butene, 6-trimethylsilyl-1-hexene, 8-trimethylsilyl-1-octene and 10-trimethylsilyl-1-decene. Two or more kinds of the above comonomers can be copolymerized with ethylene.

This ethylene copolymers made with the catalyst system typically contain from about 10% by weight or less of comonomers. In another embodiment, the ethylene copolymers made with the catalyst system contain 5% by weight or less of comonomers.

The polyethylene obtained by using the catalyst system of the present invention has a very small amount of an amorphous polymer component and therefore a small amount of a hydrocarbon-soluble component. Accordingly, a film molded from this resultant polymer has low surface tackiness and no fish eyes.

In one embodiment, the catalyst activity (measured as kilogram of polymer produced per gram of catalyst) of the catalyst system of the present invention is at least about 10.

The catalysts/methods of the present invention lead to the production of polyethylene having a relatively narrow molecular weight distribution. In one embodiment, the $M_w/M_n$ of a polyethylene polymer made with the catalyst system of the present invention is from about 3 to about 9. In another embodiment, the $M_w/M_n$ of a polyethylene polymer made with the catalyst system of the present invention is from about 3 to about 7. In yet another embodiment, the $M_w/M_n$ of a polyethylene polymer made with the catalyst system of the present invention is from about 3 to about 5.

The catalysts/methods of the present invention can in some instances lead to the production of polyethylene having melt flow indexes (MI) from about 0.001 to about 3,000 dg/min. In one embodiment, a polyethylene product has an MI from about 0.005 to about 1,000 dg/min. In another embodiment, a polyethylene product has an MI from about 0.02 to about 10 dg/min. The MI is measured according to ASTM standard D 1238.

Other useful physical property made on the polyethylene polymers described herein includes the melt index ratio (MIR) of $I_{21.6}/I_{2.16}$ as determined by ASTM standard D1238. $I_{21.6}$ is a melt index of the polymer measure at 190° C. under a load of 21.6 kg and $I_{2.16}$ is a melt index of the polymer measure at 190° C. under a load of 2.16 kg. A lower MIR shows a narrower molecular weight distribution.

According to this invention, the desired polyethylene polymer with a narrow molecular weight distribution can be obtained in a high yield while the undesired broad molecular weight distribution polyethylene can be reduced. Since the amount of the polymer yielded per unit amount of titanium is large, an operation of removing the catalyst after the polymerization can be omitted.

Employing the catalyst systems according to the present invention yields catalysts simultaneously having high catalytic efficiency, uniform and large particle size, and low fines content.

The present invention can produce ethylene polymer and copolymer having one or more of excellent melt-flowability, moldability, good hydrogen response, good control over size, shape, size distribution, and a narrower molecular weight distribution, and/or good operability. Ethylene polymer and copolymer prepared by the catalyst system according to the present invention can be used produce various forms of articles by means of blow molding, injection molding, extrusion molding, etc. It is also suitable to prepare a film by means of the T-die method and an inflation method.

It should be understood that where there is no reference to the polyunsaturated compound that can be used, the method of polymerization, the amount of the catalyst system and the polymerization conditions, the same description as the above embodiment are applicable.

Examples of systems for polymerizing olefins are now described. Referring to FIG. 1, a high level schematic diagram of a system 10 for polymerizing ethylene is shown. Inlet 12 is used to introduce catalyst system components, ethylene, hydrogen gas, fluid media, pH adjusters, surfactants, and any other additives into a reactor 14. Although only one inlet is shown, many often are employed. Reactor 14 is any suitable vehicle that can be used to polymerize ethylene. Examples of reactors 14 include a single reactor, a series of two or more reactors, slurry reactors, fixed bed reactors, gas phase reactors, fluidized gas reactors, stirred bed reactors, loop reactors, multizone circulating reactors, and the like. Once polymerization is complete, or as polyethylene is produced, the polymer product is removed from the reactor 14 via outlet 16, which leads to a collector 18. Collector 18 may include downstream processing, such as heating, extrusion, molding, and the like.

Although not shown in FIG. 1, the systems and reactors can be controlled, optionally with feedback based on continuous or intermittent testing, using a processor equipped with an optional memory and controllers. For example, a processor may be connected to one or more of the reactors, inlets, outlets, testing/measuring systems coupled with the reactors, and the like to monitor and/or control the polymerization process, based on preset data concerning the reactions, and/or based on testing/measuring data generated during a reaction. The controller may control valves, flow rates, the amounts of materials entering the systems, the conditions (temperature, pressure, reaction time, etc.) of the reactions, and the like, as instructed by the processor. The processor may contain or be coupled to a memory that contains data concerning various aspects of the polymerization process and/or the systems involved in the polymerization process.

With respect to any figure or numerical range for a given characteristic, a figure or a parameter from one range may be combined with another figure or a parameter from a different range for the same characteristic to generate a numerical range.

Other than in the operating examples, or where otherwise indicated, all numbers, values and/or expressions referring to quantities of ingredients, reaction conditions, etc., used in the specification and claims are to be understood as modified in all instances by the term "about."

The following examples illustrate the present invention. Unless otherwise indicated in the following examples and elsewhere in the specification and claims, all parts and percentages are by weight, all temperatures are in degrees Celsius, and pressure is at or near atmospheric pressure.

Example 1

12.0 g of anhydrous magnesium chloride, 200 ml of hexane, 60 ml of 2-ethylhexanol, 1.9 g of Syltherm XLT, and 0.43 g of aluminum triiso-propoxide ($Al(OiPr)_3$) were charged into a one liter Buchi reactor under $N_2$. Syltherm XLT was a product of Dow Chemicals, containing 36% of octamethyltrisiloxane, 28% of decamethyltetrasiloxane, 17% of dodecamethylpentasiloxane and 17% to 20% of polydimethylsiloxane. The reactor agitation speed was set at 300 rpm and then heated to and held at 120° C. for 1.5 hour to form a magnesium solution.

33.2 g of the magnesium solution prepared above and 15.8 g of hexane were charged into a 250 ml Buchi reactor under $N_2$. The reactor was cooled down to −20° C. at 200 rpm agitation rate. 86.4 g of $TiCl_4$ was then added into the reactor slowly while the reactor temperature was maintained below −15° C., and held at −15° C. for 15 minutes. The reactor temperature was then raised to 21° C. and 0.44 g of Syltherm XLT was added into the reactor. The reactor was held at 21° C. for 15 minutes then heated to and held at 90° C. for 1 hour. The reactor was cooled down to 50° C. and the agitation was turned off. Then the liquids were filtered out.

53 g of hexane was added into the reactor, and then a mixture of 0.25 g diethylmaleate and 3 g of hexane was added into the reactor. The agitation rate was set at 200 rpm. The reactor was heated to and held at 80° C. for 1 hour. Then the agitation was turned off and the liquids were filtered out. The solids in the reactor were washed with 65 ml of hexane at agitation of 400 rpm and 60° C. for 10 minutes. Then the liquids were filtered out. The hexane wash was repeated for three more times. The catalyst was discharged as hexane slurry.

Ethylene polymerization was performed in a one-gallon reactor. The reactor was purged at 100° C. under nitrogen for one hour. At room temperature, 0.6 ml of 25-wt % triethylaluminum (TEAL) in heptane was added into the reactor. Then 1500 ml of hexane was added and 10 mg of the catalyst prepared above were added into the reactor. The reactor was pressurized with $H_2$ to 60.0 psig then charged with ethylene to 116 psig. The reactor was heated to and held at 80° C. for two hours. At the end of the hold, the reactor was vented and the polymer was recovered.

Example 2

The catalyst was synthesized under the same conditions as Example 1 except 0.50 g of diethylmaleate was added in the catalyst synthesis. Ethylene polymerization was conducted under the same condition as Example 1.

Example 3

The catalyst was synthesized under the same conditions as Example 1 except 0.70 g of diethylmaleate was added. Ethylene polymerization was conducted at the same conditions as Example 1.

Example 4

The catalyst was synthesized under the same conditions as Example 1 except 0.85 g of diethylmaleate was added. Ethylene polymerization was conducted at the same conditions as Example 1.

Example 5

The catalyst was synthesized under the same conditions as Example 1 except 1.00 g of diethylmaleate was added. Ethylene polymerization was conducted at the same conditions as Example 1.

Example 6

The catalyst was synthesized under the same conditions as Example 1 except 1.20 g of diethylmaleate was added. Ethylene polymerization was conducted at the same conditions as Example 1.

Example 7

The catalyst was synthesized under the same conditions as Example 1 except 1.35 g of diethylmaleate was added. Ethylene polymerization was conducted at the same conditions as Example 1.

Example 8

The catalyst was synthesized under the same conditions as Example 1 except 1.50 g of diethylmaleate was added. Ethylene polymerization was conducted at the same conditions as Example 1.

Example 9

The catalyst was synthesized under the same conditions as Example 1 except 2.00 g of diethylmaleate was added. Ethylene polymerization was conducted at the same conditions as Example 1.

Example 10

The catalyst was synthesized under the same conditions as Example 1 except 1.00 g of dibutylmaleate was added. Ethylene polymerization was conducted at the same conditions as Example 1.

Example 11

The catalyst was synthesized under the same conditions as Example 10 except 1.50 g of dibutylmaleate was added. Ethylene polymerization was conducted at the same conditions as Example 1.

Comparative Example

The catalyst was synthesized under the same conditions as Example 1 except no electron donor was added. Ethylene polymerization was conducted at the same conditions as Example 1.

Certain aspects of the catalyst and polymerization are described in Table 1. Catalyst Activity is measured by kilograms of polyethylene per gram of catalyst. MI is melt flow index measured by g/10 min according to ASTM D 1238. MIR refers to $I_{21.6}/I_{2.16}$ as determined by ASTM-1238 Condition 2.16 kg and 21.6 kg at 190° C.

TABLE 1

Results from the Examples

| Example | Yield grams of polyethylene | Catalyst Activity kg/g | MI g/10 min | MIR |
|---|---|---|---|---|
| 1 | 310 | 31.0 | 0.5 | 40.8 |
| 2 | 254 | 25.4 | 1.1 | 37.9 |
| 3 | 231 | 23.1 | 1.0 | 34.6 |
| 4 | 146 | 14.6 | 1.2 | 35.3 |
| 5 | 190 | 19.0 | 1.0 | 34.6 |
| 6 | 150 | 15.0 | 1.1 | 34.7 |
| 7 | 162 | 16.2 | 0.9 | 33.7 |
| 8 | 132 | 13.2 | 1.1 | 35.0 |
| 9 | 97 | 9.7 | 0.7 | 33.9 |
| 10 | 175 | 17.5 | 0.5 | 35.1 |
| 11 | 172 | 17.2 | 1.1 | 31.5 |
| CE | 287 | 28.7 | 0.7 | 44.5 |

The results indicate that the MIR values in Examples 1-11 are much smaller than the MIR value in the Comparative Example. These data demonstrate that the resulting polyethylene of the present invention has a narrower molecular weight distribution.

It is, of course, not possible to describe every conceivable combination of the components or methodologies for purpose of describing the disclosed information, but one of ordinary skill in the art can recognize that many further combinations and permutations of the disclosed information are possible. Accordingly, the disclosed information is intended to embrace all such alternations, modifications and variations that fall within the spirit and scope of the appended claims. Furthermore, to the extent that the term "includes," "has," "involve," or variants thereof is used in either the detailed description or the claims, such term is intended to be inclusive in a manner similar to the term "comprising" as "comprising" is interpreted when employed as a transitional word in a claim.

What is claimed is:

1. A process of producing a solid catalyst component for use in ethylene polymerization, the process comprising:
    adding a magnesium compound, an aluminum alkoxide, and a first amount of a siloxane mixture into an alcohol solution to form a mixture;
    heating the mixture to form a magnesium solution;
    contacting the magnesium solution with a titanium compound;
    adding an additional amount of the siloxane mixture to form a liquid catalyst intermediate;
    heating the liquid catalyst intermediate to form catalyst intermediate particles; and
    contacting the catalyst intermediate particles with a maleate derivative to form the solid catalyst component.

2. The process according to claim 1, wherein the titanium compound has a general formula: $TiX_n(OR)_{4-n}$, wherein R is a hydrocarbon radical having 1 to 20 carbon atoms, X is a halogen, and n is from 1 to 4.

3. The process according to claim 1, wherein the magnesium compound is a magnesium halide, an alkoxy magnesium halide, an aryloxy magnesium halide, aryloxy magnesium, or a carboxylic acid salt of magnesium.

4. The process according to claim 1, wherein the alcohol solution comprises an alcohol species that contains 8 to 20 carbon atoms.

5. The process according to claim 1, wherein the maleate derivative has a general formula (I):

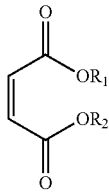 (I)

wherein $R_1$ and $R_2$ are the same or different, and wherein each of $R_1$ and $R_2$ is represented by a $C_2$-$C_{20}$ linear alkyl radical, a $C_2$-$C_{20}$ branched alkyl radical, or a $C_7$-$C_{20}$ alkylaryl radical.

6. The process according to claim 5, wherein the maleate derivative is a dialkyl maleate.

7. The process according to claim 6, wherein the dialkyl maleate comprises at least one selected from the group consisting of diethyl maleate, din-propyl maleate, di-iso-propyl maleate, di-n-butyl maleate, di-iso-butyl maleate, di-n-pentyl maleate, di-iso-pentyl maleate, dineopentyl maleate, di-n-hexyl maleate, di-iso-hexyl maleate, di-n-heptyl maleate, di-iso-heptyl maleate, di-n-octyl maleate, bis(2,2-dimethylhexyl) maleate, bis(2-ethylhexyl) maleate, di-n-nonyl maleate, diisodecyl maleate, and bis(2,2-dimethylheptyl) maleate.

8. The process according to claim 1, wherein the aluminum alkoxide has a general formula (II):

 (II)

wherein R, R', and R" are the same or different hydrocarbyl radicals of not more than 12 carbon atoms.

9. The process according to claim 8, wherein the aluminum alkoxide compound is selected from the group consisting of diethoxyaluminum butoxide, ethoxyaluminum dibutoxide, aluminum trimethoxide, aluminum triethoxide, aluminum tri-n-propoxide, aluminum triiso-propoxide, aluminum tri-n-butoxide, aluminum tri-sec-butoxide, and aluminum tri-t-butoxide.

10. The process according to claim 9, wherein the aluminum alkoxide is aluminum triiso-propoxide.

11. The process according to claim 1, wherein the siloxane mixture has a methyl group.

12. The process according to claim 11, wherein the siloxane mixture is selected from the group consisting of octamethyltrisiloxane, decamethyltetrasiloxane, dodecamethylpentasiloxane, and polymethylsiloxane.

* * * * *